US009372614B2

(12) United States Patent
Feldstein et al.

(10) Patent No.: US 9,372,614 B2
(45) Date of Patent: Jun. 21, 2016

(54) AUTOMATIC ENLARGEMENT OF VIEWING AREA WITH SELECTABLE OBJECTS

(75) Inventors: Michael Steven Feldstein, San Francisco, CA (US); Jordan Spencer Feldstein, Buffalo Grove, IL (US)

(73) Assignee: QUALCOMM Incorporated, San Diego, CA (US)

( * ) Notice: Subject to any disclaimer, the term of this patent is extended or adjusted under 35 U.S.C. 154(b) by 1554 days.

(21) Appl. No.: 12/500,504

(22) Filed: Jul. 9, 2009

(65) Prior Publication Data

US 2011/0010668 A1 Jan. 13, 2011

(51) Int. Cl.
*G06F 3/048* (2013.01)
*G06F 3/0488* (2013.01)
*G09G 5/14* (2006.01)
*G06F 17/30* (2006.01)
*G06F 3/0481* (2013.01)

(52) U.S. Cl.
CPC ............ *G06F 3/0488* (2013.01); *G06F 3/0481* (2013.01); *G06F 17/30241* (2013.01); *G06F 2203/04805* (2013.01); *G06F 2203/04806* (2013.01); *G09G 5/14* (2013.01)

(58) Field of Classification Search
CPC .................... G06F 2203/04805; G06F 3/0481; G06F 2203/04806; G06F 17/30241; G09G 5/14
USPC ......... 715/800, 765, 711, 715, 767, 788, 790, 715/798, 799, 801, 808
See application file for complete search history.

(56) References Cited

U.S. PATENT DOCUMENTS

| 6,211,856 | B1 | 4/2001 | Choi et al. | |
| 6,466,203 | B2 | 10/2002 | Ven Ee | |
| 7,746,327 | B2 * | 6/2010 | Miyakoshi | 345/173 |
| 8,042,044 | B2 * | 10/2011 | Van Leeuwen | 715/702 |
| 2002/0057281 | A1 | 5/2002 | Moroo et al. | |
| 2006/0161846 | A1 | 7/2006 | Van Leeuwen | |
| 2008/0096610 | A1 | 4/2008 | Shin et al. | |

(Continued)

FOREIGN PATENT DOCUMENTS

| KR | 10-2009-0016209 A | 2/2009 |
| WO | WO-9429788 A1 | 12/1994 |
| WO | WO-0075766 A1 | 12/2000 |

OTHER PUBLICATIONS

Microsoft Press, "Microsoft Windows User Experience," 1999, pp. xvii, 4, 6, 139, 140, 144, and 146.*

(Continued)

*Primary Examiner* — William Trapanese
*Assistant Examiner* — Daniel Um
(74) *Attorney, Agent, or Firm* — Mahamedi Paradice LLP (57) ABSTRACT

A system (and method) are disclosed for enlarging a portion of a view of a user interface displayed within a touch-sensitive screen. The system is configured to determine a predetermined touch area corresponding to a touch applied on the screen. The system provides, for display on the screen, a user interface, the user interface including selectable objects and a scrim of the user interface in response to a plurality of selectable objects being within the predetermined touch area. The system generates a magnified view of the selectable objects within the touch area and provides, for display on the screen over the scrim of the user interface, the magnified view. The area of the magnified view is greater than the touch area. Once a selection is made within the magnified view, the magnified view and scrim view are removed and the normal view of the user interface is returned.

30 Claims, 7 Drawing Sheets

(56) References Cited

U.S. PATENT DOCUMENTS

| | | | |
|---|---|---|---|
| 2008/0136785 | A1 | 6/2008 | Baudisch et al. |
| 2008/0172633 | A1 | 7/2008 | Jeon et al. |
| 2008/0282157 | A1 | 11/2008 | Day et al. |
| 2008/0284756 | A1 | 11/2008 | Hsu et al. |
| 2010/0162163 | A1* | 6/2010 | Wang et al. .................... 715/800 |
| 2012/0223903 | A1* | 9/2012 | Ludwig .................... G10H 1/00 345/173 |

OTHER PUBLICATIONS

"Computer Glasses," Custom Solutions of Maryland, 4 pages, [Online] [Retrieved on Jan. 22, 2010] Retrieved from the Internet<URL:http://customsolutionsofmaryland.50megs.com/computerglasses.htm/>.

"M2ScreenMag Screenshots, screen capture—Softpedia," 2001-2010, Softpedia, 3 pages, [Online] [Retrieved on Jan. 22, 2010] Retrieved from the Internet<URL:http://www.softpedia.com/progScreenshots/M2ScreenMag-Screenshot-80484.html>.

"Desktop Magnifier for Windows 1.7.30," 1996-2010, Download 32, 3 pages, [Online] [Retrieved on Jan. 22, 2010] Retrieved from the Internet<URL:http://www.download32.com/desktop-magnifier-for-windows-s37074.html>.

"DeskLensExp 2.0.0," 1996-2010, Download 32, 3 pages, [Online] [Retrieved on Jan. 22, 2010] Retrieved from the Internet<URL:http://www.download32.com/desklensexp-s30352.html>.

"Magic Lens Max 2.0," 1996-2010, Download 32, 3 pages, [Online] [Retrieved on Jan. 22, 2010] Retrieved from the Internet<URL:http://www.download32.com/magic-lens-max-s32286.html>.

PCT International Search Report and Written Opinion, PCT Application No. PCT/US2010/039542, Jan. 24, 2011, 10 pages.

Beaufort, Francois, "I'm sure you've already accidentally touched more than one link at a time . . .", Blog post shared publicly on Dec. 23, 2014, reprinted from world wide web at https://plus.google.com/+FrancoisBeaufort/posts/3P4WZ6iDBZm on May 27, 2015, 1 page.

Tofel, Kevin C., "A key touch feature from Android is available in Chrome OS", article dated Dec. 23, 2014, Gigaom, Inc., reprinted from world wide web at https://gigaom.com/2014/12/23/a-key-touch-feature-from-android-is-availble-in-chrome-os/ on May 21, 2015, 5 pages.

Supplementary European Search Report—EP10797583—Search Authority—Munich—Jan. 22, 2016.

* cited by examiner

AUTOMATIC ENLARGEMENT OF VIEWING AREA WITH SELECTABLE OBJECTS

BACKGROUND

1. Field of Art

The disclosure generally relates to the field of display screens, and more specifically, to display of selectable information within a bounded screen area.

2. Description of the Art

Computing devices with small screens, for example, smartphones and functionality enhanced mobile phones, are well known. Such computing devices include screens that display network and application user interfaces, for example, web browser pages or applets. These user interfaces may have a large volume of information that includes selectable objects within the rendered user interface. Moreover, the screens are configured to be touch sensitive to allow direct interaction with the user interface through the screen.

One problem with having such selectable objects within a rendered user interface is that the objects often are difficult to read due to the small viewing area. Another problem with selectable objects within the rendered user interface is that the selectable objects are often in very close proximity to each other, for example, adjacent to each other. Hence, a user is required to have very fine motor skills in order to select a desired selectable object. Such fine motor skills often are difficult to apply and in such instances a wrong selectable object is often selected.

One attempt to address the shortcomings of the art has been to allow a user to manually increase the zoom of the user interface being rendered. However, invoking that zoom feature enlarges the entire user interface, typically forcing out of view from a screen portions of the originally rendered user interface. Often the portions of the user interface forced out of view include the relevant elements sought to be zoomed, including potentially selectable links. Moreover, many user interfaces lack mechanisms to allow zooming.

Hence, the art lacks, inter alia, a mechanism for enlarging relevant portions of a user interface without requiring interacting with application commands for zooming.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG.) 1a illustrates one embodiment of a mobile computing device in a first positional state.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

One embodiment of a disclosed system (and method and computer readable storage medium) that is configured to enlarge a portion of a view of a user interface displayed within a touch-sensitive screen. In one embodiment, the system is configured to determine a predetermined touch zone corresponding to a unit of measure associated with a touch applied on the screen. The predetermined touch zone can be calibrated specific to a user and/or set as a default. The touch zone may be measured units of linear distance or area using values that can be determined in pixels or more conventional units of measures such as millimeters or inches (or corresponding unit of area measurement).

General Example Overview

The system provides, for display on the screen, a user interface for auto magnification. The user interface including selectable objects (or items), for example, hyperlinks or push-pins (or bubbles). The system also provides, for display on the screen, a scrim of the user interface in response to a portion a plurality of selectable objects being positioned within the predetermined touch zone anywhere in the user interface as displayed on the screen. The touch zone can be based on linear distance, area or other measurement parameter and may be based on a touch detected on the screen and measured as a radius, a diameter, a perimeter, a length and width or corresponding area.

The system generates an enlarged view of the touch zone based on detection of the plurality of selectable objects that are present within the predetermined touch zone. The system provides, for display on the screen over the scrim of the user interface, the generated enlarged view that has an area greater than the touch zone. The enlarged view provides a zoom of the previous predetermined radius area and can be configured to partially cover the screen. The result includes having an enlarged viewing area wherein the selectable objects are present to allow for easier interaction with the selectable objects within, for example, a small screen or display area. When the system receives an indication of a selection within the enlarged view, the enlarged view and scrim view are removed and the normal view of the user interface within the screen is returned.

Example Mobile Computing Device

Figure 1A:
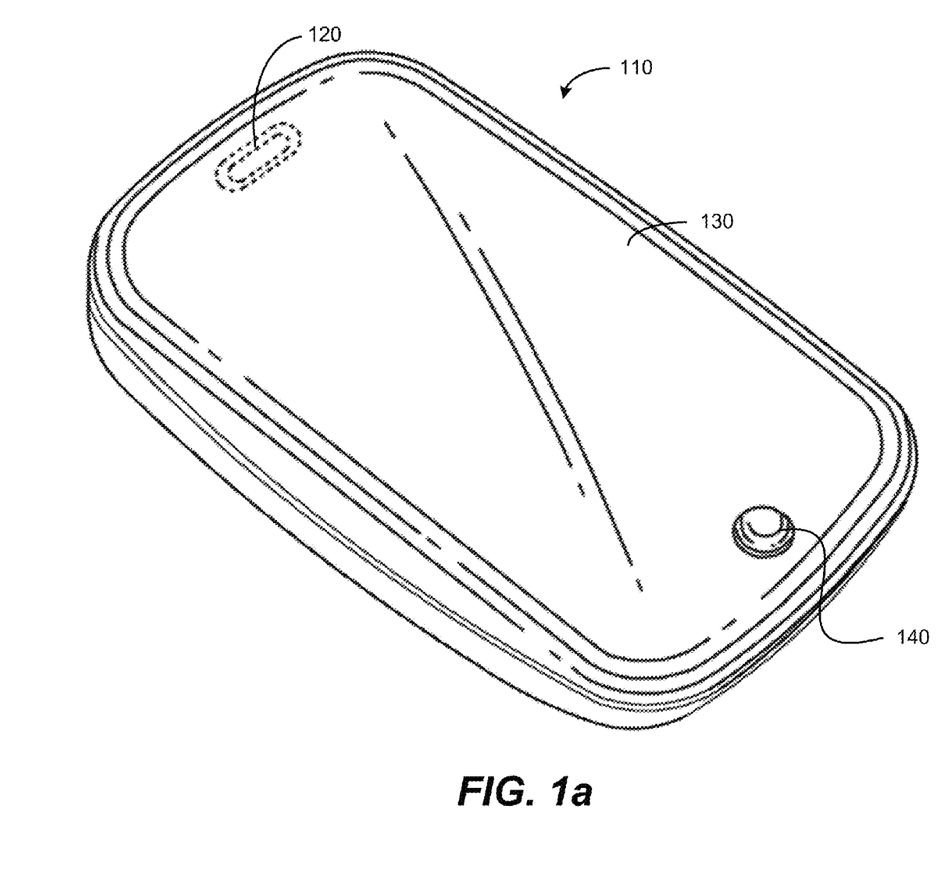

Figure (FIG.) 1a illustrates one embodiment of a first positional state of a mobile computing device 110 having telephonic functionality, e.g., a mobile phone or smartphone.

Figure 1B:
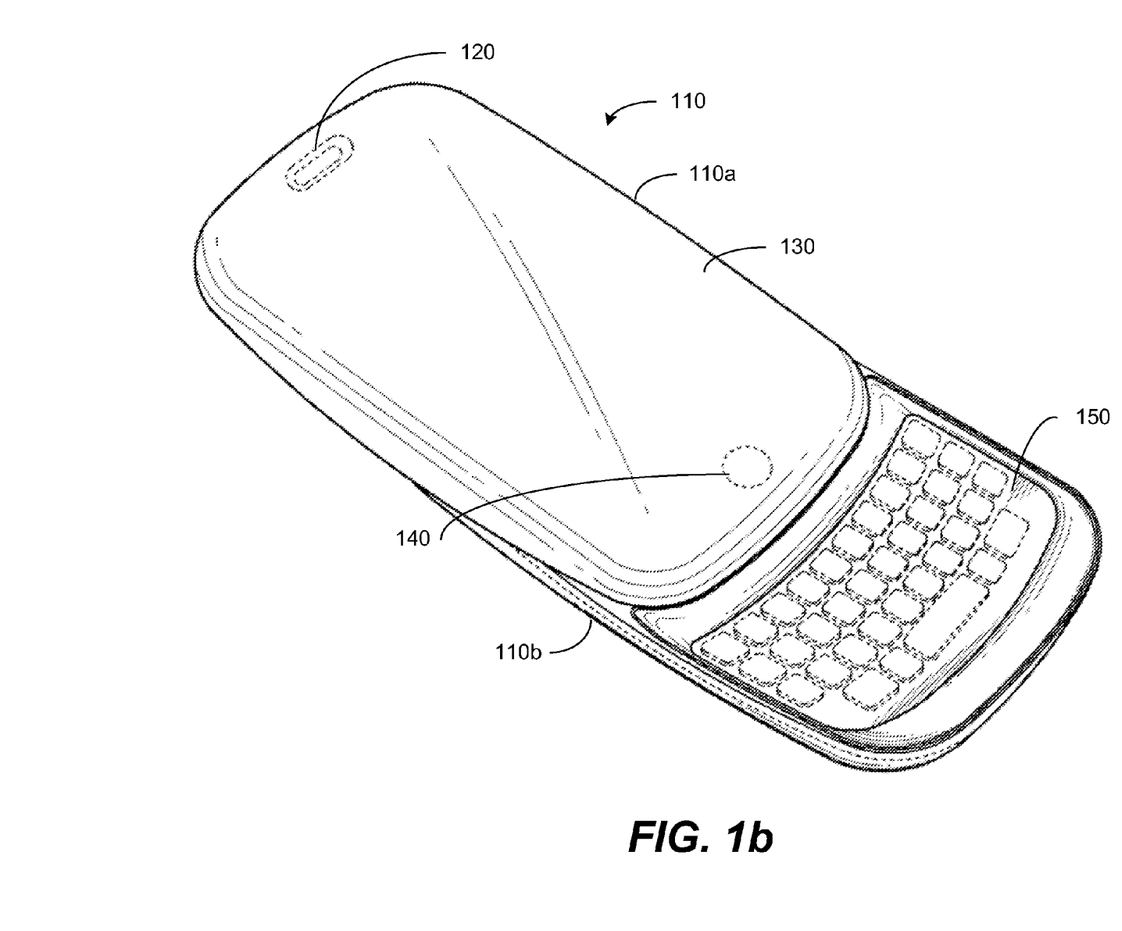
FIG. 1b illustrates one embodiment of the mobile computing device in a second positional state.

FIG. 1b illustrates one embodiment of a second positional state of the mobile computing device 110 having telephonic functionality, e.g., a mobile phone or smartphone. The mobile computing device is configured to host and execute a phone application for placing and receiving telephone calls. It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) and/or data networks having voice over internet protocol (VoIP) functionality.

The mobile computing device 110 includes a first portion 110a and a second portion 110b. The first portion 110a comprises a screen for display of information (or data) and may include navigational mechanisms. These aspects of the first portion 110a are further described below. The second portion 110b comprises a keyboard and also is further described below. The first positional state of the mobile computing device 110 may be referred to as an "open" position, in which the first portion 110a of the mobile computing device slides in a first direction exposing the second portion 110b of the mobile computing device 110 (or vice versa in terms of movement). The mobile computing device 110 remains operational in either the first positional state or the second positional state.

The mobile computing device 110 is configured to be of a form factor that is convenient to hold in a user's hand, for example, a personal digital assistant (PDA) or a smart phone form factor. For example, the mobile computing device 110 can have dimensions ranging from 7.5 to 15.5 centimeters in length, 5 to 15 centimeters in width, 0.5 to 2.5 centimeters in thickness and weigh between 50 and 250 grams.

The mobile computing device 110 includes a speaker 120, a screen 130, and an optional navigation area 140 as shown in the first positional state. The mobile computing device 110 also includes a keypad 150, which is exposed in the second positional state. The mobile computing device also includes a microphone (not shown). The mobile computing device 110 also may include one or more switches (not shown). The one or more switches may be buttons, sliders, or rocker switches and can be mechanical or solid state (e.g., touch sensitive solid state switch).

The screen 130 of the mobile computing device 110 is, for example, a 240×240, a 320×320, a 320×480, or a 640×480 touch sensitive (including gestures) display screen. The screen 130 can be structured from, for example, such as glass, plastic, thin-film or composite material. The touch sensitive screen may be a transflective liquid crystal display (LCD) screen. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infra-red)) including a digitizer for receiving input data, commands or information from a user. In conventional configurations, a user may use a stylus, a finger or another suitable input device for data entry, such as selecting from a menu or entering text data.

The optional navigation area 140 is configured to control functions of an application executing in the mobile computing device 110 and visible through the screen 130. For example, the navigation area includes an x-way (x is a numerical integer, e.g., 5) navigation ring that provides cursor control, selection, and similar functionality. In addition, the navigation area may include selection buttons to select functions displayed through a user interface on the screen 130. In addition, the navigation area also may include dedicated function buttons for functions such as, for example, a calendar, a web browser, an e-mail client or a home screen. In this example, the navigation ring may be implemented through mechanical, solid state switches, dials, or a combination thereof. In an alternate embodiment, the navigation area 140 may be configured as a dedicated gesture area, which allows for gesture interaction and control of functions and operations shown through a user interface displayed on the screen 130.

The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards). Examples of memory or media card form factors include COMPACTFLASH, SD CARD, XD CARD, MEMORY STICK, MULTIMEDIA CARD, SDIO, and the like.

Example Mobile Computing Device Architectural Overview

Figure 2:
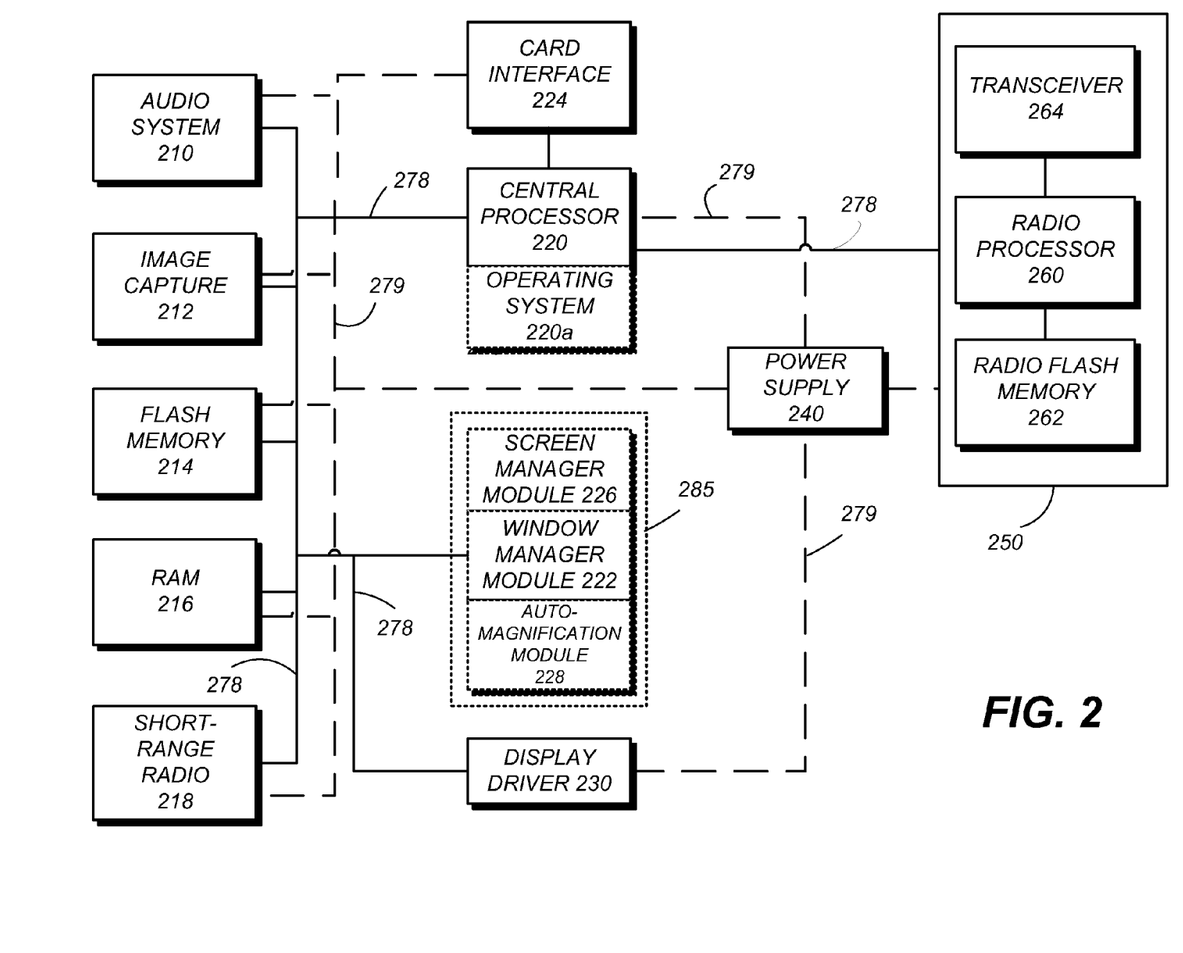
FIG. 2 illustrates one embodiment of an architecture of a mobile computing device.

Referring next to FIG. 2, a block diagram illustrates one embodiment of an architecture of a mobile computing device 110, with telephonic functionality. By way of example, the architecture illustrated in FIG. 2 will be described with respect to the mobile computing device of FIGS. 1a and 1b. The mobile computing device 110 includes a central processor 220, a power supply 240, and a radio subsystem 250. The central processor 220 is configured for operation with a computer operating system. The operating system is an interface between hardware and an application, with which a user typically interfaces. The operating system is responsible for the management and coordination of activities and the sharing of resources of the mobile computing device 110. The operating system provides a host environment for applications that are run on the mobile computing device 110. As a host, one of the purposes of an operating system is to handle the details of the operation of the mobile computing device 110.

The central processor 220 communicates with an audio system 210, an image capture subsystem (e.g., camera, video or scanner) 212, flash memory 214, RAM memory 216, a short range radio module 218 (e.g., Bluetooth, Wireless Fidelity (WiFi) component (e.g., IEEE 802.11)), and an user interface rending module 285. The central processor communicatively couples these various components or modules through a data line (or bus) 278. The power supply 240 powers the central processor 220, the radio subsystem 250 and a display driver 230 (which may be contact- or inductive-sensitive). The power supply 240 may correspond to a direct current source (e.g., a battery pack, including rechargeable) or an alternating current (AC) source. The power supply 240 powers the various components through a power line (or bus) 279.

The central processor communicates with applications executing within the mobile computing device 110 through the operating system 220a. In addition, intermediary components, for example, the user interface rendering module 285 provides additional communication channels between the central processor 220 and operating system 220 and system components, for example, the display driver 230a. The user interface rendering module 285 includes a window manager module 222, a screen manager module 226, and an auto magnification module 228.

In one embodiment, the window manager module 222 comprises a software (e.g., integrated with the operating system) or firmware (lower level code that resides is a specific memory for that code and for interfacing with specific hardware, e.g., the processor 220). The window manager module 222 is configured to initialize a virtual display space, which may be stored in the RAM 216 and/or the flash memory 214. The virtual display space includes one or more applications currently being executed by a user and the current status of the executed applications. The window manager module 222 receives requests, from user input or from software or firmware processes, to show a window and determines the initial position of the requested window. Additionally, the window manager module 222 receives commands or instructions to modify a window, such as resizing the window, moving the window or any other command altering the appearance or position of the window, and modifies the window accordingly.

The screen manager module 226 comprises a software (e.g., integrated with the operating system) or firmware. The screen manager module 226 is configured to manage content that will be displayed on the screen 130. In one embodiment, the screen manager module 226 monitors and controls the physical location of data displayed on the screen 130 and which data is displayed on the screen 130. The screen manager module 226 alters or updates the location of data as viewed on the screen 130. The alteration or update is responsive to input from the central processor 220 and display driver 230, which modifies appearances displayed on the screen 130. In one embodiment, the screen manager 226 also is configured to monitor and control screen brightness. In addition, the screen manager 226 is configured to transmit control signals to the central processor 220 to modify power usage of the screen 130.

The auto magnification module 228 comprises software, e.g., integrated with the operating system or as an application configured to communicate with the operating system, or firmware. The auto magnification module 228 is configured to magnify (or enlarge or zoom) a view shown on a screen 130 as further disclosed herein.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120 (or 184). The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile (or greater), High Speed Download Packet Access (HSDPA), High Speed Uplink Packet Access (HSUPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using the data line (or bus) 278.

The card interface 224 is adapted to communicate with the expansion slot. The card interface 224 transmits data and/or instructions between the central processor and an expansion card or media card included in the expansion slot. The card interface 224 also transmits control signals from the central processor 220 to the expansion slot to configure an expansion card or media card included in the expansion slot.

In one embodiment, central processor 220 executes logic (by way of programming, code, instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

Configuring an Auto Magnification Module

As previously noted, the auto magnification module 228 is configured to magnify (or enlarge) a portion of a user interface view. The portion that is magnified corresponds to an area of a user interface in which two or more selectable objects are located in very close proximity. For example, the proximity may be such that two more selectable objects may overlap. In another example, the proximity may be such that two or more selectable objects are within a predetermined radius, diameter or perimeter so that selection of one could end up inadvertently selecting the one of the others. In these examples, the selectable objects may be selectable hyperlinks or selectable push pins (or bubbles) (e.g., used on maps such as GOOGLE MAPS, MAPQUEST or MICROSOFT BING MAPS.

Figure 3A:
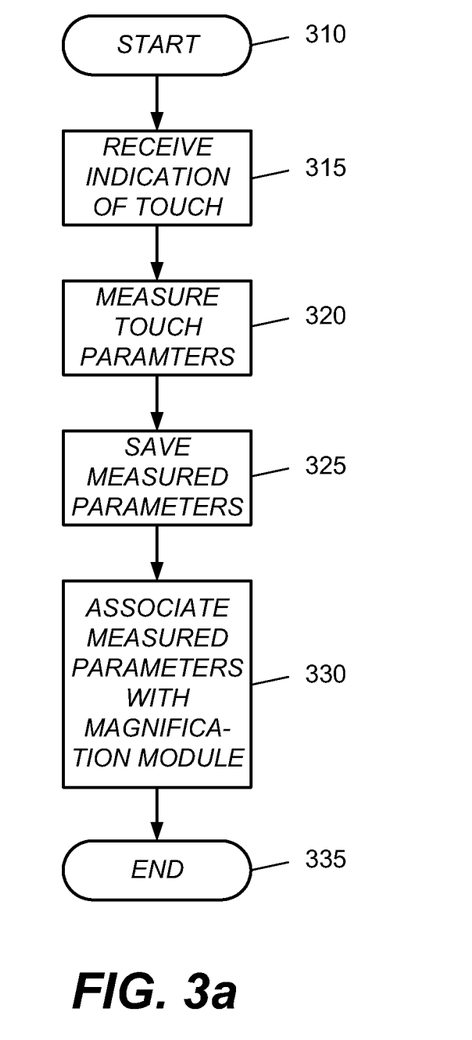
FIG. 3a illustrates one embodiment of process for calibration of a device and corresponding user interface for determination of magnification.
Figure 3B:
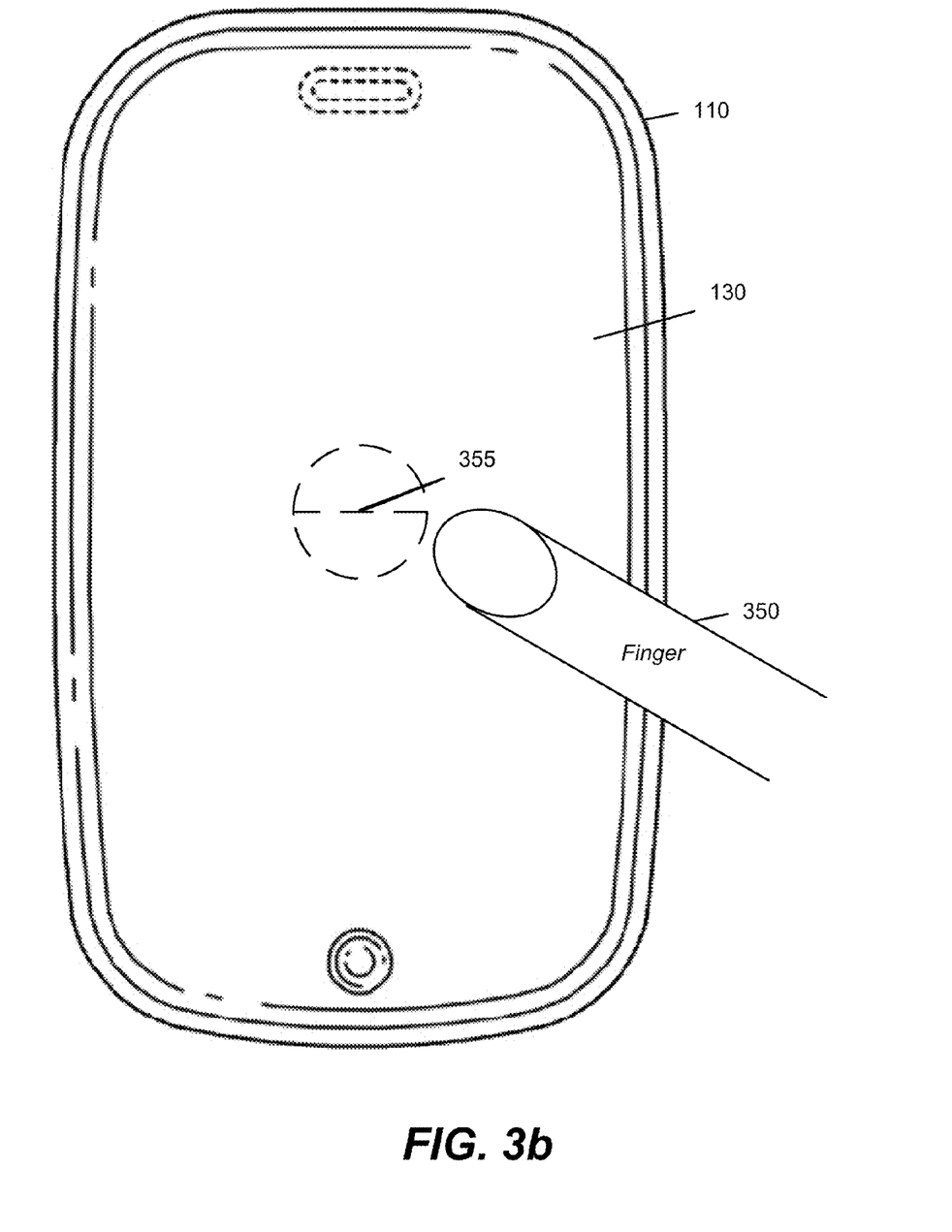
FIG. 3b illustrates one embodiment a user interaction for calibration.

FIGS. 3a and b, illustrate one embodiment of process for calibration of a device to correspond with a user interface for determination of magnification. FIG. 3a illustrates one example embodiment of a process for calibration and FIG. 3b illustrates a one example embodiment of a calibration on the screen 130 of the mobile computing device 110. The process starts 310 with execution of a calibration module (not shown) by the processor 220 of the mobile computing device 110. The calibration module is configured to have the display driver 230 calibrate the touch sensitive screen 130 of the mobile computing device 110 with respect to the auto magnification module 228.

The calibration module receives 315 a signal corresponding to an indication of touch on the screen 130 by a finger 350 (or some object corresponding to triggering the touch sensitive screen). The calibration module measures 320 touch parameters corresponding to the touch on the screen 130. Examples of touch parameters include measurement of a touch area, for example, a radius, diameter, perimeter, or length and width in pixels. For ease of discussion, the touch parameters corresponding to a diameter of a finger in units of measure corresponding to a pixel size are used for the description herein.

The calibration module saves 325 the touch parameters, e.g., number of pixels corresponding to the diameter 355 of the received touch by the finger 350 on the touch screen 130. The area in which two or more selectable objects are within the boundaries identified through the calibration process may be referred to as an area of spatial separation. In one embodiment the touch parameters are stored in the flash memory 214 of the mobile computing device 110. The calibration module now can associate 330 the measured parameters with the auto magnification module 228 before ending 335. The association with the auto calibration module 228 describes a proximity as being within or at the boundaries of the touch parameters.

Auto Magnification Operation

Figure 4A:
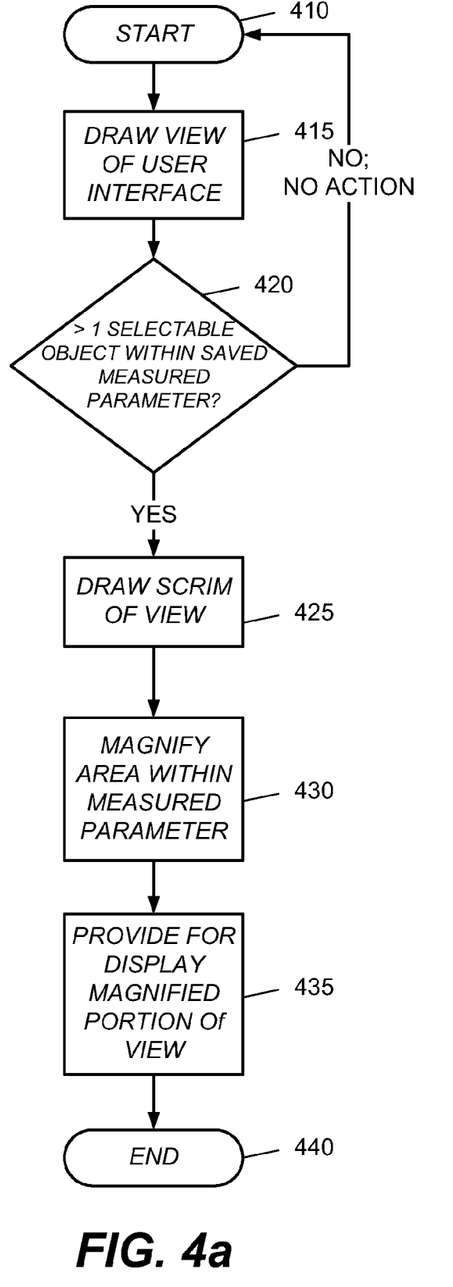
FIG. 4a illustrates one embodiment of a process for automatically magnifying a portion of user interface.

FIG. 4a illustrates one embodiment of a process for automatically magnifying a portion of user interface. The process starts 410 with the processor 220 receiving a command to render a user interface on the screen 130. The process draws 130 a view of that user interface on the screen 130. The process determines 420 if in the view of the user interface there are more than one (greater than 1) selectable objects within the area of spatial separation, e.g., boundaries of the saved touch parameters such as the number of pixels corresponding to a diameter of a touch by a finger. If not, no action is taken and the process returns to start. If there is more than one selectable object within the boundaries of the saved touch parameters, the process draws 425 a scrim of the original (or current) user interface view. The process magnifies 430 the area within the measured parameters and provides for display 435 over the scrim of the original user interface view the magnified portion of the view before ending 440.

With the magnified view, selectable objects that previously may have been in too close proximity to touch with ease, e.g., because of overlap or cramped proximity, are now spatially separated in the magnified view. The spatial separation allows for ease of interacting via touch on the screen 130.

Figure 4B:
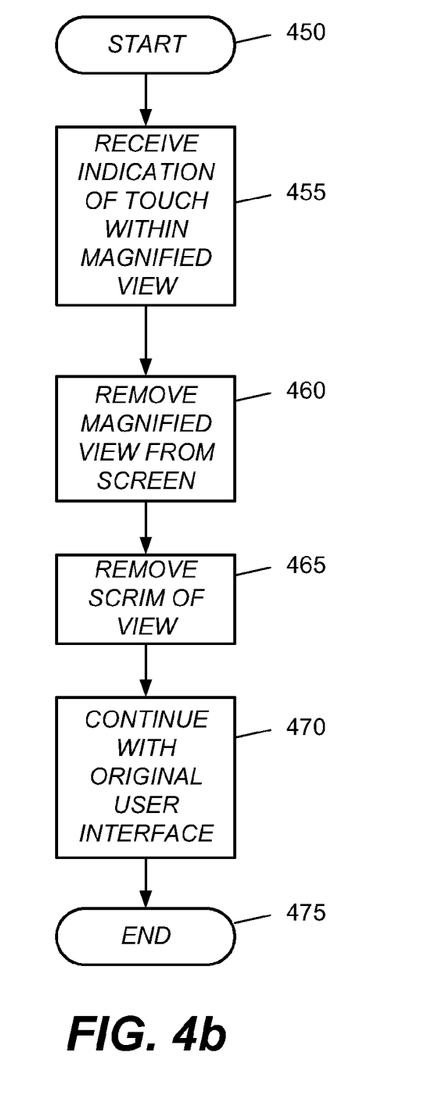
FIG. 4b illustrates one embodiment of a process for removing a magnified view from user interface

Once interaction with the magnified view is complete the process removes the magnified view from display on the screen 130. FIG. 4b illustrates one embodiment of a process for removing a magnified view from user interface. The process starts 450 and receives 455 an indication of touch within the magnified view. The processor 220 processes the signal corresponding to the indication of touch and removes 460 the magnified view from the screen and removes 465 the scrim of the original user interface view. The process now allows the user to continue 470 with interactions with the original user interface view before ending 475.

Figure 5:
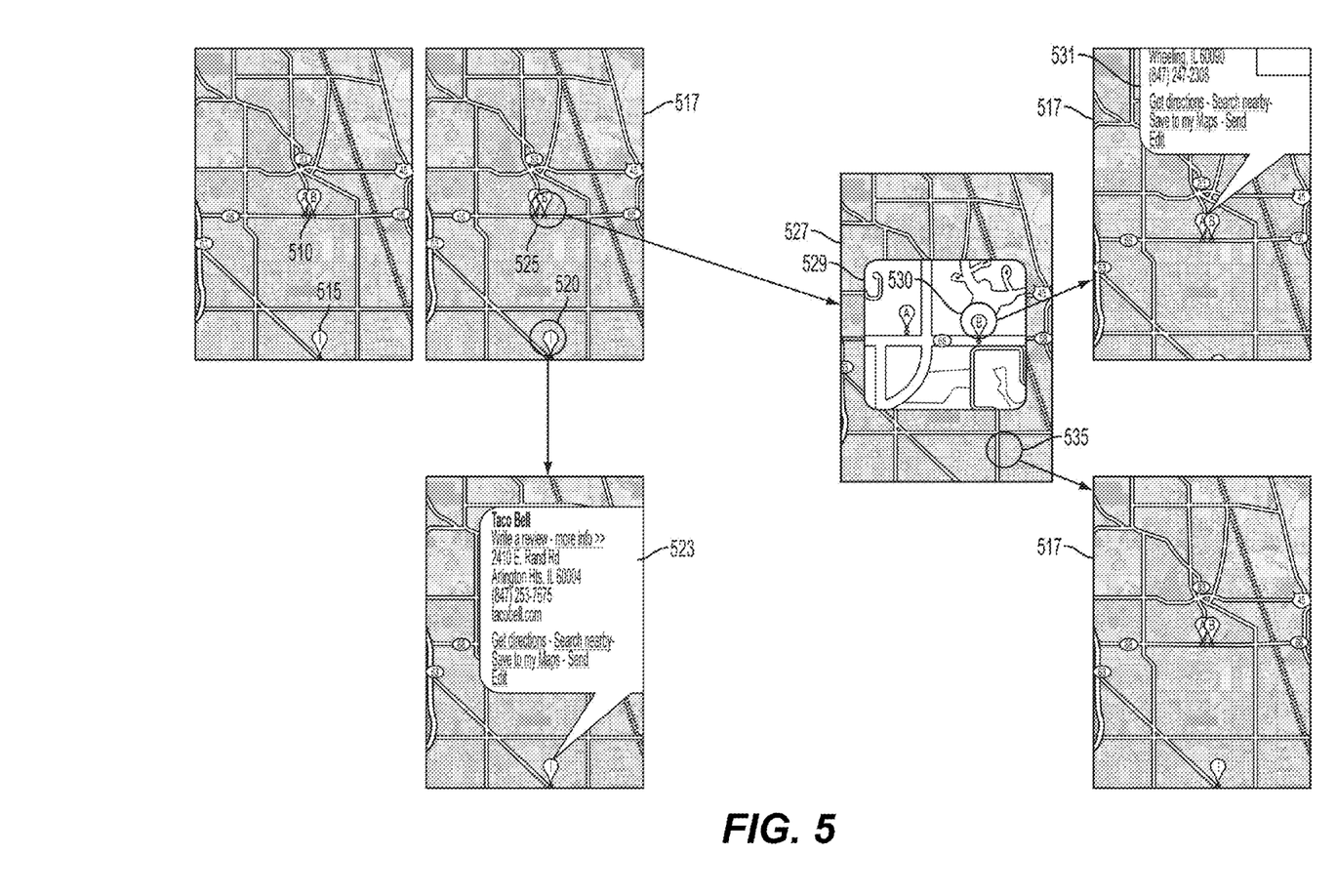
FIG. 5 illustrates one embodiment of example user interfaces for magnifying a portion of a user interface.

FIG. 5 illustrates one embodiment of example user interfaces provide for display on a screen 130 of the mobile computing device. The user interfaces illustrate an example corresponding to magnifying a portion of a user interface based on the process described above. FIGS. 5(1) and (2) illustrate the original user interface view 517 presented (displayed) on the screen 130 of the mobile computing device. In this example, a map shows three locations of interest represented by pushpins. Each pushpin is a selectable object. The first two locations, 'A' and 'B' pushpins, are shown in a first area 510 of the view and a third location 520, an 'I' pushpin, is shown in a second area 520 of the view. The first two locations are spatially condensed in the view while the third location is in a spatially separate area of the original user interface view 517.

In FIG. 5(2), if a user taps 520 on the 'I' pushpin the user is given a balloon pop up over the original user interface view with more information 523 on the 'I' pushpin. In this example, FIG. 5(3) shows information 523 corresponding to the 'I' pushpin, which includes additional details on a TACO BELL restaurant at that location. If, however, the user taps 525 on the location of the 'A' and 'B' pushpins, the process determines that these pushpins do not have the requisite spatial separation. Hence, the process creates a scrim view 527 of the original user interface view 517. On top the scrim view 527, the process provides for display a magnified box view 529 of the area where the 'A' and 'B' pushpins are located. In the magnified box view 529, the 'A' and the 'B' pushpins are separated due to the magnified view of the region of the user interface. A user may now easily select between the two pushpins due to their spatial separation in the magnified box view 529.

If a user taps 530 on the 'B' pushpin the process removes the magnified box view 529, removes the scrim 527 of the original user interface view, and shows the original user interface view 517 and a pop up 531 corresponding to the selected 'B' pushpin over that view 517. In this example, the pop up shows additional details of the selected location at the 'B' pushpin. If, however, from the magnified view of FIG. 5(4) a selection was made outside of the magnified view box 529, the process removes the magnified view box 529, removes the scrim 527 of the original user interface view, and returns back to the original user interface view 517 as shown in FIG. 5(6).

It is noted that if there were two or more selectable object, e.g., pushpins, in close proximity in the magnified view box 529, the process could be configured to provide additional magnification through the principles disclosed herein. For example, if the process detects selection around where the pushpins are in close proximity, it can remove the scrim 527 of the original view, create a full screen scrim of the magnified view box 529, and overlay that full screen scrim of the magnified view box 529 with a new (or second) magnified view box. The new magnified view box 529 would now have an enlarged view with spatial separation within the user interface. Again, if there are two or more pushpins that lack the requisite spatial separation, then the process can again be repeated for those pushpins within the user interface.

Although the example provided is in the context of map, the principles reviewed can apply to other contexts of user interfaces with selectable objects. For example, web page with two or more selectable object, e.g., hyperlinks or buttons, within close proximity can be rendered in a magnified view box to create spatial separation within the magnified view. In applications, lists with multiple selectable objects, e.g., phone book entries, can be configured to create a magnified view box for those entries adjacent to each other in order to create spatial separation to more easily interact with a particular list entry.

In addition, the configurations disclosed may be integrated into each application in which a user interface has selectable objects that may be in close proximity to each other. In alternate embodiments, the configuration disclosed herein can be integrated in at system level so that applications and applets may make system level calls to provide the user interface configuration as disclosed herein rather than having to integrate the features directly into the application.

The configuration for auto magnification as described herein beneficially provide automated zooming of a portion of a user interface in which selectable objects are in close proximity. The closeness of the proximity may be user specific as determined through a calibration process that determines whether links are within a predetermined boundary (or distance) of each other as displayed on a screen 130 of a mobile computing device. Hence, the configurations as disclosed provide ease of use and interaction through user interfaces that may be rendered on within small viewing areas or screens.

Additional Considerations for Auto Magnification

Some portions of above description describe the embodiments in terms of algorithms and symbolic representations of operations on information, for example, as illustrated and described with respect to FIGS. 2, 3a, 4a, and 5a. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for automatically enlarging a view of user interface view based on the proximity of selectable objects within that view through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for operating a computing device, the method comprising:
   determining a touch area of a user detected on a touch-sensitive screen of the computing device;
   defining an area of spatial separation for the user based on the touch area; providing, for display on the touch-sensitive screen, a user interface that includes selectable objects;
   receiving a first user input on the touch-sensitive screen;
   determining that two or more selectable objects are within the area of spatial separation of the first user input, the two or more selectable objects being in such close proximity that selection by the user of one could inadvertently select one of the others;
   in response to determining that the two or more selectable objects are within the area of spatial separation, providing, for display on the touch-sensitive screen, a scrim of the user interface, and providing, for display on the touch-sensitive screen over the scrim of the user interface, a magnified view of a portion of the user interface that includes the two or more selectable objects, so that the two or more selectable objects are individually selectable;
   receiving a second user input of a selection of one of the two or more selectable objects within the magnified view; and
   removing the scrim of the user interface and the magnified view in response to receiving the second user input of the selection.

2. The method of claim 1, further comprising:
   in response to receiving the second user input of the selection, performing an operation corresponding to the selection.

3. The method of claim 1, wherein defining the area of spatial separation based on the touch area of the user includes measuring the length or width of the determined touch area in pixels of the touch-sensitive screen.

4. The method of claim 3, further comprising:
   storing the measured length or width of the determined touch area in a memory resource.

5. The method of claim 4, wherein determining that two or more selectable objects are within the area of spatial separation comprises comparing the length or the width of the stored touch area with the distance between the two or more selectable objects.

6. A non-transitory computer readable storage medium storing instructions that, when executed by a processor of a computing device, cause computing device to:
   determine a touch area of a user detected on a touch-sensitive screen of the computing device;
   define an area of spatial separation for the user based on the touch area;
   provide, for display on the touch-sensitive screen, a user interface that includes selectable objects;

receive a first user input on the touch-sensitive screen;

determine that two or more selectable objects are within the area of spatial separation of the first user input, the two or more selectable objects being in such close proximity that selection by the user of one could inadvertently select one of the others;

in response to determining that two or more selectable objects are within the area of spatial separation, provide, for display on the touch-sensitive screen, a scrim of the user interface, and provide, for display on the touch-sensitive screen over the scrim of the user interface, a magnified view of a portion of the user interface that includes the two or more selectable objects, so that the two or more selectable objects are individually selectable;

receive indication of a second user input of a selection of one of the two or more selectable objects within the magnified view; and remove the scrim of the user interface and the magnified view in response to receiving the second user input of the selection.

7. The computer readable storage medium of claim 6, wherein execution of the instructions causes the computing device to:

in response to receiving the second user input of the selection, perform an operation corresponding to the selection.

8. The computer readable storage medium of claim 7, wherein execution of the instructions causes the computing device to define the area of spatial separation based on the touch area of the user by measuring the length or width of the determined touch area in pixels of the touch-sensitive screen.

9. The computer readable storage medium of claim 7, wherein execution of the instructions causes the computing device to:

store the measured length or width of the determined touch area in a memory resource.

10. A computer implemented method for operating a computing device, the method comprising:

providing, for display on a touch-sensitive screen of the computing device, a user interface that includes selectable objects;

receiving a first user input on the touch-sensitive screen;

determining that two or more selectable objects are within an area of spatial separation of the first user input, the two or more selectable objects being in such close proximity that selection by the user of one could inadvertently select one of the others;

in response to determining that the two or more selectable objects are within the area of spatial separation, generating a magnified view of a portion of the user interface that includes the two or more selectable objects, so that the two or more selectable objects are individually selectable;

receiving a second user input of a selection of one of the two or more selectable objects within the magnified view; and removing the magnified view in response to receiving the second user input of the selection.

11. The method of claim 10, further comprising:

determining the area of spatial separation from a touch area of the user, wherein the touch area has a length or a width detected on the touch-sensitive screen; and storing the touch area in a memory resource.

12. The method of claim 11, wherein determining that two or more selectable objects are within the area of spatial separation comprises comparing the length or the width of the stored touch area with the distance between the two or more selectable objects.

13. The method of claim 11, wherein the length or the width of the touch area is measured in pixels of the touch-sensitive screen.

14. The method of claim 10, wherein the user interface corresponds to at least one of a map or a web page.

15. The method of claim 10, further comprising:

in response to receiving the second user input of the selection, performing an operation corresponding to the selection.

16. The method of claim 15, wherein performing the operation corresponding to the selection includes displaying a pop up user interface that includes information corresponding to the selection of one of the two or more selectable objects.

17. A non-transitory computer readable storage medium storing instructions that, when executed by a processor of a computing device, cause the computing device to:

provide, for display on a touch-sensitive screen of the computing device, a user interface that includes selectable objects;

receive a first user input on the touch-sensitive screen;

determine that two or more selectable objects are within an area of spatial separation of the first user input, the two of more selectable objects being in such close proximity that selection by the user of one could inadvertently select one of the others;

in response to determining that the two or more selectable objects are within the area of spatial separation, generate a magnified view of a portion of the user interface that includes the two or more selectable objects, so that the two or more selectable objects are individually selectable;

receive a second user input of a selection of one of the two or more selectable objects within the magnified view; and remove the magnified view in response to receiving the second user input of the selection.

18. The computer readable storage medium of claim 17, wherein execution of the instructions causes the computing device to:

determine the area of spatial separation from a touch area of the user, wherein the touch area has a length or a width detected on the touch-sensitive screen; and store the touch area in a memory resource.

19. The computer readable storage medium of claim 18, wherein the length or the width of the touch area is measured in pixels of the touch-sensitive screen.

20. The computer readable storage medium of claim 17, wherein the user interface corresponds to at least one of a map or a web page.

21. The computer readable storage medium of claim 17, wherein execution of the instructions causes the computing device to:

in response to receiving the second user input of the selection, perform an operation corresponding to the selection.

22. The computer readable storage medium of claim 21, wherein execution of the instructions causes the computing device to perform the operation corresponding to the selection by displaying a pop up user interface that includes information corresponding to the selection of one of the two or more selectable objects.

23. A computing device, comprising:

one or more processors;

a touch-sensitive screen;

memory storing one or more programs configured for execution by the one or more processors, the one or more programs comprising instructions that, when executed by the one or more processors, cause the computing device to perform operations comprising:
   providing, for display on the touch-sensitive screen of the computing device, a user interface that includes selectable objects;
   receiving a first user input on the touch-sensitive screen;
   determining that two or more selectable objects are within an area of spatial separation of the first user input, the two or more selectable objects being in such close proximity that selection by the user of one could inadvertently select one of the others;
   in response to determining that the two or more selectable objects are within the area of spatial separation, generating a magnified view of a portion of the user interface that includes the two or more selectable objects, so that the two or more selectable objects are individually selectable;
   receiving a second user input of a selection of one of the two or more selectable objects within the magnified view; and
   removing the magnified view in response to receiving the second user input of the selection.

24. The computing device of claim 23, wherein the one or more programs further comprise instructions that, when executed by the one or more processors, cause the computing device to perform operations comprising:
   determining the area of spatial separation from a touch area of the user, wherein the touch area has a length or a width detected on the touch-sensitive screen; and
   storing the touch area in a memory resource.

25. The computing device of claim 24, wherein the length or the width of the touch area is measured in pixels of the touch-sensitive screen.

26. The computing device of claim 23, wherein the user interface corresponds to at least one of a map or a web page.

27. The computing device of claim 23, wherein the one or more programs further comprise instructions that, when executed by the one or more processors, cause the computing device to perform operations comprising:
   in response to receiving the second user input of the selection, performing an action corresponding to the selection.

28. The computing device of claim 27, wherein performing the operation corresponding to the selection includes displaying a pop up user interface that includes information corresponding to the selection of one of the two or more selectable objects.

29. The computing device of claim 24, wherein determining that two or more selectable objects are within the area of spatial separation comprises comparing the length or the width of the stored touch area with the distance between the two or more selectable objects.

30. A computing device, comprising:
   means for providing, for display on a touch-sensitive screen of the computing device, a user interface that includes selectable objects;
   means for receiving a first user input on the touch-sensitive screen;
   means for determining that two or more selectable objects are within an area of spatial separation of the first user input, the two or more selectable objects being in such close proximity that selection by the user of one could inadvertently select one of the others;
   means for, in response to determining that the two or more selectable objects are within the touch area, generating a magnified view of a portion of the user interface that includes the two or more selectable objects, so that the two or more selectable objects are individually selectable;
   means for receiving a user input of a selection of one of the two or more selectable objects within the magnified view; and
   means for removing the magnified view in response to receiving the user input of the selection.

* * * * *